US011187570B2

(12) United States Patent
Feisst

(10) Patent No.: US 11,187,570 B2
(45) Date of Patent: Nov. 30, 2021

(54) TEMPERATURE-RESISTANT FILL LEVEL MEASUREMENT DEVICE

(71) Applicant: Endress+Hauser SE+Co. KG, Maulburg (DE)

(72) Inventor: Klaus Feisst, Stegen (DE)

(73) Assignee: Endress+Hauser SE+Co. KG, Maulburg (DE)

(*) Notice: Subject to any disclaimer, the term of this patent is extended or adjusted under 35 U.S.C. 154(b) by 287 days.

(21) Appl. No.: 16/471,772

(22) PCT Filed: Nov. 22, 2017

(86) PCT No.: PCT/EP2017/080049
§ 371 (c)(1),
(2) Date: Jun. 20, 2019

(87) PCT Pub. No.: WO2018/114186
PCT Pub. Date: Jun. 28, 2018

(65) Prior Publication Data
US 2020/0088562 A1 Mar. 19, 2020

(30) Foreign Application Priority Data

Dec. 20, 2016 (DE) ...................... 10 2016 124 982.3

(51) Int. Cl.
*G01F 23/284* (2006.01)
*G01S 13/88* (2006.01)
*G01S 7/02* (2006.01)

(52) U.S. Cl.
CPC ............ *G01F 23/284* (2013.01); *G01S 13/88* (2013.01); *G01S 7/027* (2021.05)

(58) Field of Classification Search
CPC .................................................. G01F 23/284
See application file for complete search history.

(56) References Cited

U.S. PATENT DOCUMENTS 5,560,511 A * 10/1996 McNerney ............. B65D 85/82
220/327
7,255,002 B2 * 8/2007 Gravel .................. G01F 23/284
73/290 R
(Continued)

FOREIGN PATENT DOCUMENTS

| DE | 102009028620 A1 | 2/2011 |
| WO | 2009129997 A1 | 10/2009 |
| WO | 2011020668 A2 | 2/2011 |

OTHER PUBLICATIONS

Wu Yeqing; Embedded System Reliability Design Technology and Case Analysis; Beihang University Press; Jul. 31, 2012; pp. 65-69.

*Primary Examiner* — Peter M Bythrow
(74) *Attorney, Agent, or Firm* — Mark A. Logan; Endress+Hauser (USA) Holding Inc.

(57) ABSTRACT

The present disclosure relates to a radar-based fill-level measurement device for measuring a fill level of a fill substance located in a container. Besides a housing, the device includes an antenna and a housing neck, which is arranged between the housing and the antenna, wherein the housing neck has between the housing and the antenna a predefined thermal resistance, and at least one electronics module partially arranged in the housing neck. The thermal resistance of the housing neck is dimensioned in such a manner to be low, such that, at a temperature in the container of at least 200° C., the temperature at the electronics module is limited to, at most, 80° C. Thus, a high resolution and temperature-resistant and simultaneously compact, fill-level measurement device is provided for high radar frequencies of, for example, 79 GHz.

10 Claims, 3 Drawing Sheets

(56) References Cited

U.S. PATENT DOCUMENTS

| | | | |
|---|---|---|---|
| 9,110,165 B2* | 8/2015 | Feisst | H01Q 13/24 |
| 9,719,832 B2* | 8/2017 | Klofer | G01F 23/284 |
| 2002/0053238 A1* | 5/2002 | Fahrenbach | G01F 23/284 |
| | | | 73/290 R |
| 2002/0126061 A1* | 9/2002 | Griessbaum | H01Q 13/02 |
| | | | 343/786 |
| 2003/0201842 A1* | 10/2003 | Gard | G01F 23/268 |
| | | | 333/24 R |
| 2005/0253751 A1 | 11/2005 | Feisst et al. | |
| 2008/0134778 A1* | 6/2008 | Osswald | G01F 23/284 |
| | | | 73/304 C |
| 2008/0303710 A1* | 12/2008 | Kienzle | G01F 23/284 |
| | | | 342/124 |
| 2009/0212996 A1* | 8/2009 | Chen | G01F 23/284 |
| | | | 342/124 |
| 2009/0302867 A1* | 12/2009 | Schroth | G01S 7/2921 |
| | | | 324/642 |
| 2012/0186339 A1* | 7/2012 | Feisst | G01F 23/284 |
| | | | 73/290 V |
| 2014/0266862 A1* | 9/2014 | Fredriksson | G01F 23/284 |
| | | | 342/124 |
| 2017/0010142 A1* | 1/2017 | Feisst | G01S 13/88 |
| 2018/0113020 A1* | 4/2018 | Fredriksson | G01F 23/284 |

\* cited by examiner

TEMPERATURE-RESISTANT FILL LEVEL MEASUREMENT DEVICE

CROSS-REFERENCE TO RELATED APPLICATIONS

The present application is related to and claims the priority benefit of German Patent Application No. 10 2016 124 982.3, filed on Dec. 20, 2016 and International Patent Application No. PCT/EP2017/080049, filed on Nov. 22, 2017, the entire contents of which are incorporated herein by reference.

TECHNICAL FIELD

The invention relates to a radar-based fill-level measurement device for measuring a fill level of a fill substance located in a container, wherein the fill-level measurement device can be applied also in the case of high temperatures reigning in the container.

BACKGROUND

In automation technology, especially in process automation technology, field devices are often applied, which serve for registering and/or for influencing process variables. For registering process variables, sensors are applied, which are used, for example, in fill-level measurement devices, flow measurement devices, pressure- and temperature measurement devices, pH-redox potential measurement devices, conductivity measurement devices, etc. They register the corresponding process variables, such as fill level, flow, pressure, temperature, pH value, redox potential and conductivity. A large number of these field devices are manufactured and sold by the firm, Endress+Hauser.

For fill level measurement in the case of fill substances in containers, contactless measuring methods have been developed, since they are robust and have low-maintenance. A further advantage of contactless measuring methods is their ability to measure fill level virtually continuously, thus, with a high resolution. For this reason, primarily radar-based measuring methods are applied in such case. Established measuring principles include the FMCW measuring principle ("Frequency Modulated Continuous Wave") and the so-called pulse travel time method. In both cases, a high frequency electromagnetic signal is transmitted via an antenna secured on the container and directed into the interior of the container, in the direction of the fill substance. In such case, the frequencies of the transmitted electromagnetic waves lie in the region of a standardized center frequency. Because of governmental regulations, as a rule, frequencies of 6 GHz, 26 GHz, or 79 GHz are used for this. The functional principle of pulse travel time methods is explained in the publication, DE 10 2010 063 430 A1, for example. The FMCW measuring principle is explained in the publication, WO 2012/139852 A1, for example. Independently of measurement principle, higher frequencies are advantageous, since with rising frequency also the resolution of the fill level measurement potentially rises.

Depending on field of application, temperatures in the container interior can be up to 200° C. In such case, a special challenge is to insulate the fill-level measurement device thermally from the container interior, since the electronic components of the field device are usually only designed to withstand temperatures up to 80° C. The thermal insulation of the electronic components occurs often via a thermally insulating housing neck having high thermal resistance and arranged between the antenna and the housing, which is located away from the container. In such case, the electronic components are located in the housing. For this purpose, the housing neck is dimensioned with a certain minimum length as well as a correspondingly smaller cross sectional area, in order that a best possible thermal resistance between the antenna and the housing is established. As other measures for increasing thermal resistance, it is, moreover, known to use a thermally insulating element, for example, a ceramic body, in the interior of the housing neck.

Toward high radar frequencies (wherein under high in the sense of the invention even frequencies below 79 GHz are considered high), it is, for reasons of a sufficient signal transmission to the antenna, however, no longer possible to arrange the electronics modules for the high frequency signal production remotely from the antenna: Therefore, in these cases, a (long) housing neck must be avoided.

SUMMARY

An object of the invention, therefore, is to provide a fill-level measurement device, which can be applied in the case of high temperatures reigning in the container.

The invention achieves this object by a radar-based fill-level measurement device for measuring a fill level (L) of a fill substance located in a container, comprising:

A housing,
an antenna, which is embodied in such a manner and arranged on the container, in order to transmit electromagnetic waves ($T_{HF}$) in the direction of the fill substance and/or to receive electromagnetic waves ($R_{HF}$) reflected in the container,
a housing neck, which is arranged between the housing and the antenna, wherein the housing neck has between the housing and the antenna a predefined thermal resistance ($R_{th,H}$),
at least one electronics module arranged partially in the housing neck.

The housing neck is distinguished according to the invention in that thermal resistance ($R_{th,N}$) of the housing neck is so dimensioned that, at a temperature ($T_C$) of at least 200° C. near the antenna in the container, the temperature ($T_E$) at the electronics module is limited to, at most, 80° C. For this purpose, thermal resistance ($R_{th,N}$) is preferably less than 15 Kelvin per watt, especially less than 10 Kelvin per watt. To achieve this, the housing neck is preferably manufactured of a thermally conductive material, especially of stainless steel, aluminum or copper. Of these materials, copper has the greatest heat conductivity. In this way, a very compact embodiment of the housing neck of the invention can be achieved. Stainless steel, in contrast, has among these materials the greatest mechanical and chemical durability and can, consequently, preferably be used when the fill-level measurement device is exposed to aggressive environmental conditions.

In the context of the invention, thermal resistance ($R_{th,N}$) of the neck is defined as:

$$R_{th,N} = \frac{1}{\lambda_N} * \frac{l_N}{A_N}.$$

In such case, $l_N$ is the length of the housing neck and $A_N$ is its cross sectional area. $\lambda_N$ is the heat conductivity of the utilized housing material with the units, $$\left[\frac{W}{mK}\right]$$

Because of the arrangement according to the invention of the electronics module in the housing neck, a temperature-resistant fill-level measurement device is provided, which can be applied also in the case of high radar frequencies. In this way, an improved accuracy of fill level measurement can be achieved, as compared with fill-level measurement devices of the state of the art. The temperature resistance of the fill-level measurement device is effected according to the invention, in that, counter to the general technical knowledge, the housing neck is given a lessened thermal resistance ($R_{th,N}$), such that the temperature ($T_E$) are the electronics module can be reduced to significantly under 80° C. Because of the increased thermal conductivity in the housing neck, the housing neck- and antenna components located below the electronics module are thermally well coupled to the actual housing acting as cooling body and, in this way, the convection currents from the, in given cases, hot antenna over the electronics module and to housing are minimized. A slight increasing of the temperature in the actual housing is, in such case, not critical.

Besides the used material, thermal resistance of the housing neck can be influenced corresponding to the above mentioned formula by the geometric design of the housing neck, especially its cross sectional geometry, length ($l_N$), average outer diameter ($D_N$) and average wall thickness ($d_N$). In an advantageous form of the invention, the housing neck has, consequently, preferably, for instance, a round cross section with a corresponding outer diameter ($D_N$) and a wall thickness ($d_N$). The cross sectional area $A_N$, in this case, is $$A_N = \pi(D_N d_N - d_N^2).$$

In such case, another development of the fill-level measurement device of the invention provides that the housing neck has, for the case, in which it is manufactured of stainless steel $$\left(\lambda_N = 15\frac{W}{mK}\right),$$

an average minimum wall thickness ($d_N$) of 4 mm. Furthermore, it is advantageous relative to the outer diameter ($D_N$), when the housing neck in the case of stainless steel has a maximum average outer diameter ($D_N$) of 80 mm. Moreover, it is possible to achieve a small thermal resistance ($R_{th,N}$) of the invention, by giving the housing neck, for the case, in which the housing neck is manufactured of stainless steel, a maximum length ($l_N$) of 140 mm. In the case of such a design ($d_N$=4 mm, $D_N$=80 mm, $l_N$=140 mm, $$\lambda_G = 15\frac{W}{mK},$$

in the case of round cross sectional area $A_N$), the above mentioned formulas give a thermal resistance ($R_{th,N}$) of about 9.78 Kelvin per watt.

This dimensional example illustrates an additional advantage: Because of the invention, the housing neck, and, thus, the entire fill-level measurement device, can be implemented essentially more compactly than possible in the prior art.

For a further improved thermal decoupling of the electronics module from the housing neck and an associated additional temperature lowering at the electronics module, the housing neck includes in another development of the invention an inner surface having a thermally insulating layer. Such can be a wall coating. An option is, however, also the provision of a plastic or ceramic insert. In the case of plastic, especially PPS (polyphenylene sulfide) can be used. For the same purpose, it is, moreover, advantageous to arrange a thermally insulating element in the housing neck between the electronics module and the antenna.

The connections of the housing neck to the antenna and to the housing are in the simplest case non-releasable and accordingly accomplished with a one piece construction. Alternatively, it is, however, preferable that the antenna and/or the housing be connected with the housing neck via at least one releasable connection. In such case, it is for the purpose of further lessening thermal resistance ($R_{th,N}$) advantageous to provide a heat conductive paste on the at least one releasable connection.

BRIEF DESCRIPTION OF THE DRAWINGS

The invention will now be explained in greater detail based on the appended drawing, the figures of which show as follows.

DETAILED DESCRIPTION

Figure 1:
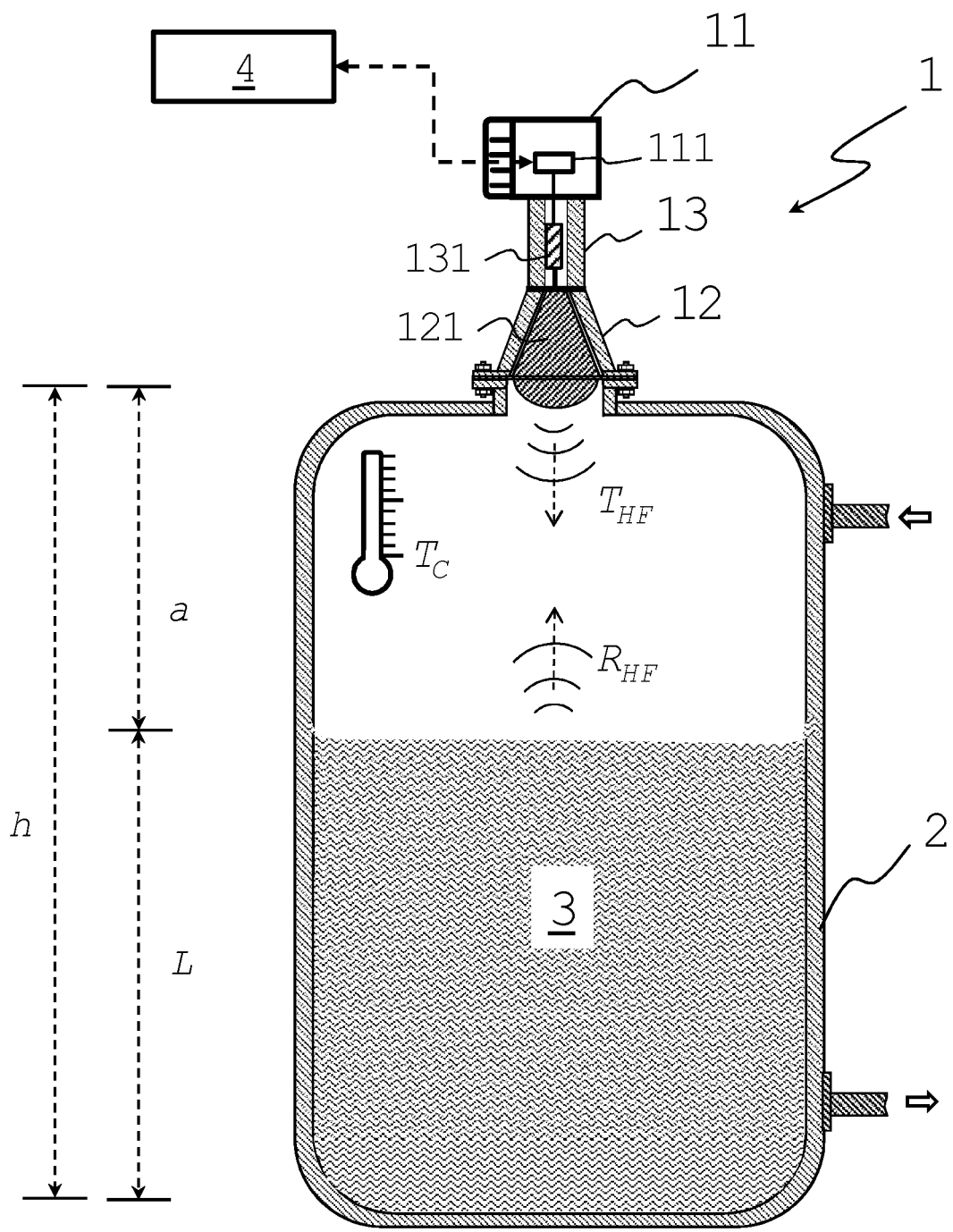
FIG. 1 shows a schematic view of a fill-level measurement device of the present disclosure mounted on a container.

For an improved understanding of the invention, FIG. 1 shows an arrangement of a radar-based fill-level measurement device 1 of the invention on a container 2. Located in the interior of the container 2 is a fill substance 3, whose fill level L is to be determined.

For determining fill level L, the fill-level measurement device 1 is mounted on the container 2 above the fill substance 3 at, with reference to the container floor, a known installed height h, which, depending on container size, can be more than 30 m high. For this, the fill-level measurement device 1 is arranged in such a manner by means of a flange connection on the top of the container 2 that it transmits electromagnetic waves $T_{HF}$, which are produced by an electronics module 131, via an antenna 12 in the direction of the fill substance 3. This can occur using the FMCW- or pulse travel time methods, for example, at a frequency of 79 GHz or higher.

After reflection on the fill substance surface, fill-level measurement device 1 receives the reflected electromagnetic waves $R_{HF}$ back via the antenna 12. In such case, the travel time measured by the fill-level measurement device 1 between transmitting and receiving the high frequency electromagnetic waves $T_{HF}$, $R_{HF}$ depends on the distance a to the fill substance surface. The subsequent calculating of the fill level L from the travel time, or the distance a, for the fill substance surface is done by the fill-level measurement device 3 using its installed height h: L=h−a. The calculation is done by a corresponding device electronics 111 of the field device 1. Device electronics 111 is contained within a housing 11.

The fill-level measurement device 3 of the invention can, such as shown in FIG. 1, be connected via the device electronics 111 by means of a bus system, for instance, a "PROFIBUS", "HART" or "wireless HART" bus system, to a superordinated unit 4, for example, a process control system. In this way, on the one hand, information concerning the fill level L can be sent to the process control system, in order, in given cases, to control in- or outgoing flows to or from the container 2. It is, however, also possible to communicate information concerning the operating state of the fill-level measurement device 1.

Arranged within the antenna 12 is a process seal 121, for example, made of a chemically inert plastic, in order to seal the fill-level measurement device 1 fluid-tightly from the interior of the container 2. Besides the necessity of a fluid seal, it is, however, additionally, necessary to protect the fill-level measurement device 1 against temperature influences from the interior of the container 2.

Depending on application, a temperature $T_C$ of up to 200° C. and higher can reign in the interior of the container 2, for example, due to a chemical reaction occurring in the fill substance 3 at the moment. Since the electronic components 111, 131 of the field device 1 are designed, as a rule, however, only for a temperature $T_E$ up to about 80° C., the field device 1 includes for protecting the electronic components against thermal loading a housing neck 13, which is arranged between the antenna 12 and the housing 11.

For achieving a best possible resolution in the case of the fill level measurement, the electronics module 131 for the high frequency signal production must be arranged near the antenna 12. The reason for this is that the in-coupling of the electromagnetic waves $T_{HF}$ into the antenna 12 in the case of high transmitting/receiving frequencies, for example, 79 GHz, is very loss burdened as distance increases. Therefore, the electronics module 131 is not arranged in the more remote housing 11, but, instead, in the housing neck 13 located nearer to the antenna 12. In order nevertheless to protect the electronics module 131 against possible thermal loading from the interior of the container 2, the housing neck 13 has, according to the invention, a thermal resistance $R_{th,N}$ sufficiently small that at a temperature of at least 200° C. in the container 2 (especially at the site of the antenna 12) the temperature $T_E$ of the electronic component 131 rises at most to 80° C.

Figure 2:
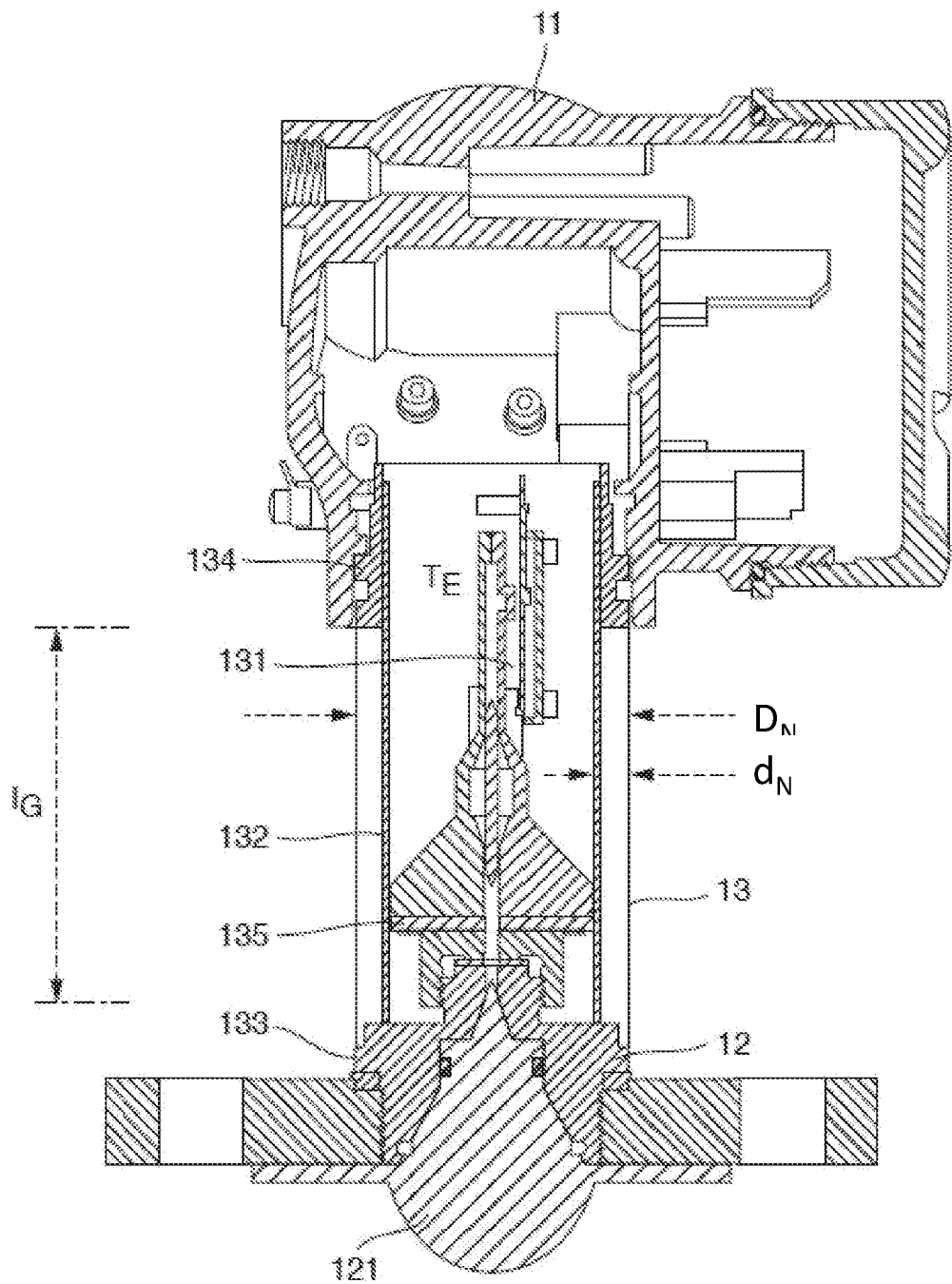
FIG. 2 shows a detailed representation of a fill-level measurement device of the present disclosure.

A detailed sectional view of the fill-level measurement device 1 of the invention is shown in FIG. 2. In this representation, the variables influencing thermal resistance $R_{th,N}$ are more exactly evident: besides the material, of which the housing neck 13 is manufactured, these are, above all, the geometric dimensions of the housing neck 13: the length $l_N$, the outer diameter $D_N$ as well as the wall thickness $d_N$ of the housing neck 13 (in the shown representation, the housing neck 13 has, for instance, a round cross section).

Figure 3:
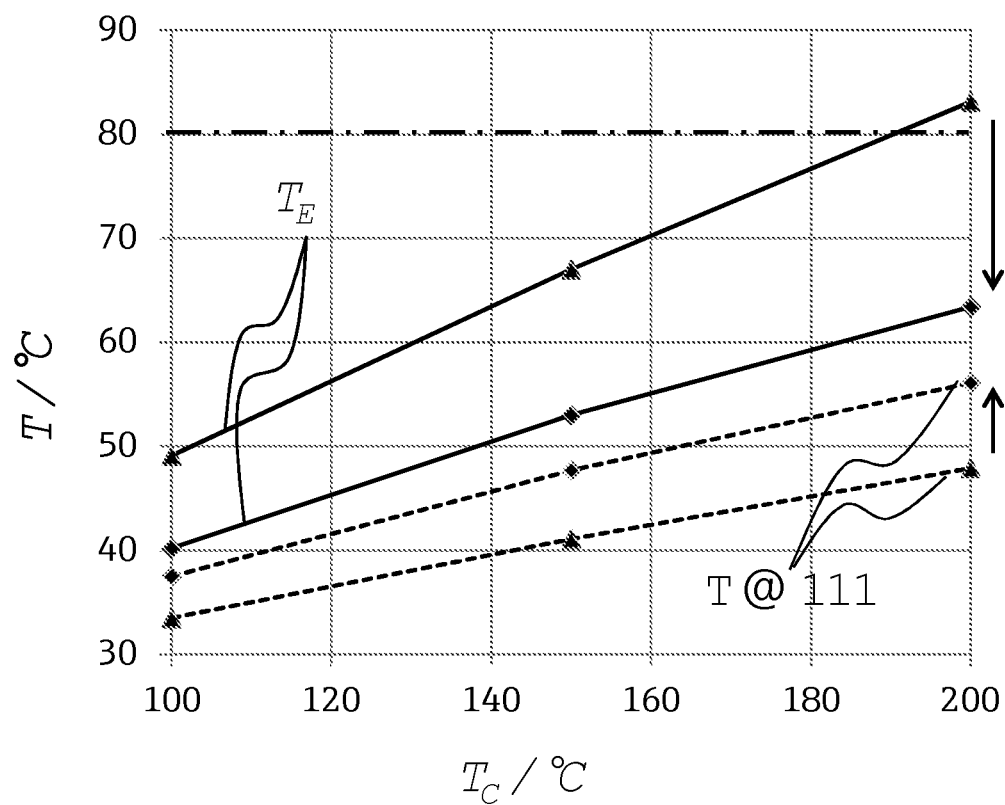
FIG. 3 shows a graph of temperature of the electronic component as a function of temperature in the container.

How, for example, a change of the wall thickness $d_N$ affects thermal resistance $R_{th,N}$ of the housing neck 13 is evident from the graph of FIG. 3: at a temperature of 200° C. in the container 2 and an increase of the wall thickness $d_N$ from 2 mm to 5.6 mm (this corresponds to reducing thermal resistance $R_{th,N}$ from about 19.04 Kelvin/watt to about 7.13 Kelvin/watt, when the other dimensions remain unchanged at $D_N$=80 mm, $l_N$=140 mm, $$\lambda_N = 15 \frac{W}{mK})$$

the temperature $T_E$ at the electronics module 131 lessens from about 83° C. to about 63° C., which then represents an uncritical temperature for the electronics module 131. These simulation values are based on the assumption that the housing neck 13 in the case of a wall thickness $d_N$ of 5.6 mm for thermal decoupling of the electronics module 131 has additionally a 1 mm thick, thermally insulating insert 132 of PPS on the inner surface of the housing neck 13 (see FIG. 2). As shown in FIG. 2, it would, for this purpose, moreover, be an option to arrange in the housing neck 13 a thermally insulating element 135 (for example, a correspondingly embodied ceramic having a high thermal resistance) between the electronic component 131 and the antenna 12.

The graph of FIG. 3 additionally shows that the lessening of thermal resistance $R_{th,N}$ is accompanied by a slight increase of the temperature at the device electronics 111 in the housing 11. In the sense of the invention, this can, however, be tolerated, since the temperature of the device electronics 111 is still significantly below 80° C. Rather, according to the invention, it is effected that also the electronic component 131 located in the housing neck 13 is thermally decoupled from the container 2 in such a manner that, even at a temperature of 200° C. in the container 2, the temperature $T_E$ at the electronic component 131 in the housing neck 13 remains below 80° C.

The invention claimed is:

1. A radar-based fill-level measurement device for measuring a fill level of a fill substance located in a container, comprising:
    a housing;
    an antenna that is embodied in such a manner and arranged on the container, in order to transmit electromagnetic waves in the direction of the fill substance and to receive electromagnetic waves reflected in the container;
    a housing neck embodied of a thermally conductive material and arranged between the housing and the antenna and thermally coupled with the housing and the antenna, wherein the housing neck has between the housing and the antenna a predefined thermal resistance of less than 15 Kelvin per watt; and
    an electronics module arranged partially in the housing neck,
    wherein the thermal resistance of the housing neck is so dimensioned that, at a temperature in the container of 200° C., a temperature at the electronics module amounts to, at most, 85° C.

2. The fill-level measurement device as claimed in claim 1,
    wherein the thermally conductive material is stainless steel, aluminum, or copper.

3. The fill-level measurement device as claimed in claim 1,
    wherein the housing neck has a round cross section.

4. The fill-level measurement device as claimed in claim 3,
    wherein the housing neck is manufactured of stainless steel, and the housing neck has an average minimum wall thickness of 4 mm.

5. The fill-level measurement device as claimed in claim 4, wherein the housing neck has a maximum average outer diameter of 80 mm.

6. The fill-level measurement device as claimed in claim 4, wherein the housing neck has a maximum length of 140 mm.

7. The fill-level measurement device as claimed in claim 1, wherein the housing neck has an inner surface with a thermally insulating layer of polyphenylene sulfide.

8. The fill-level measurement device as claimed in claim 1, wherein the antenna and/or the housing are/is connected with the housing neck via at least one releasable connection.

9. The fill-level measurement device as claimed in claim 8, wherein a heat conductive paste is provided on the at least one releasable connection.

10. The fill-level measurement device as claimed in claim 1, further comprising:
a thermally insulating element arranged in the housing neck between the electronics module and the antenna.

* * * * *